United States Patent Office

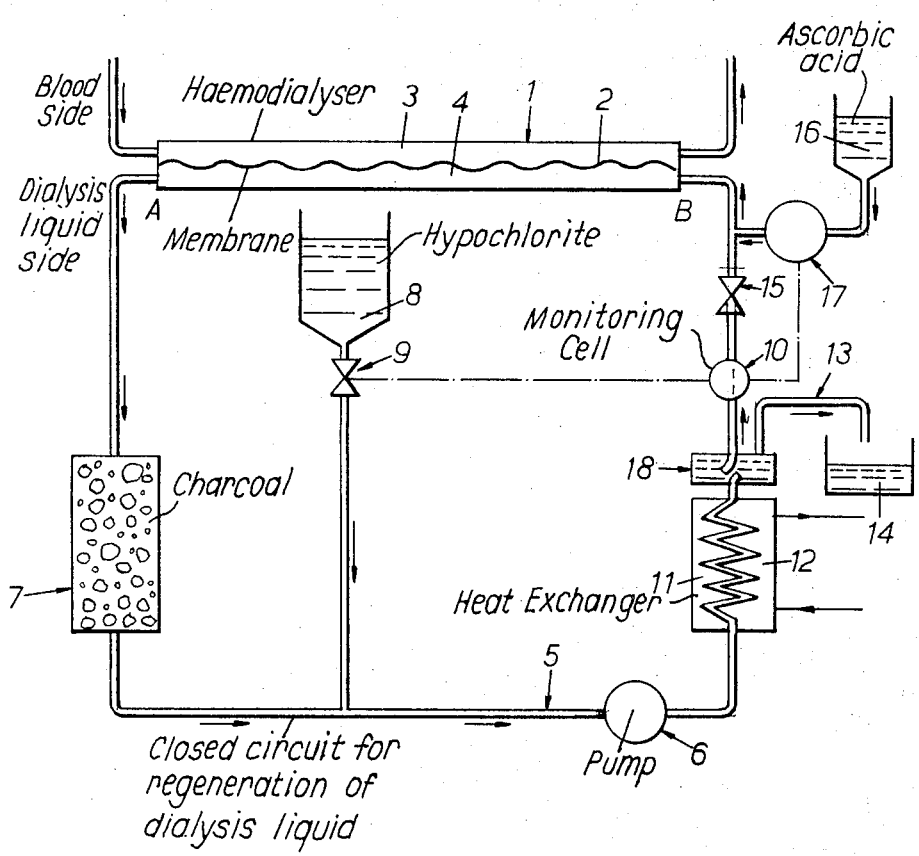

3,827,975
Patented Aug. 6, 1974

3,827,975
PROCESS FOR THE REGENERATION OF A HAEMODIALYSIS LIQUID
Jean Bizot, Morangis, and Andre Sausse, Sceaux, France, assignors to Rhone-Poulenc S.A., Paris, France
Filed Dec. 14, 1972, Ser. No. 314,672
Claims priority, application France, Dec. 14, 1971, 71.44867
Int. Cl. B01d 13/00, 31/00
U.S. Cl. 210—22                                                 14 Claims

ABSTRACT OF THE DISCLOSURE

Dialysis liquid which has passed through a haemodialyser, is regenerated by addition of sodium hypochlorite. This can degrade urea and other nitrogenous impurities without producing by-products incompatible in a dialysing liquid for use in haemodialysis. A dialysis liquid of relatively small volume can thus be circulated in closed circuit through a haemodialyser.

---

The present invention relates to a process for the chemical regeneration of the dialysis liquid obtained during haemodialysis.

The processes for purifying the blood of patients deprived of renal function generally involve dialysis of the blood. For each dialysis session, usually lasting from 8 to 10 hours, large amounts of dialysis liquid (approximately 300 to 400 litres) are employed and complex and expensive controlling and regulating apparatus is used.

Means have been sought for decreasing the volume of dialysis liquid required and for simplifying the apparatus, and, to achieve this, for regenerating the dialysis liquid as dialysis proceeds.

Treatment of the dialysis liquid with active charcoal removes a large proportion of the waste matter, but it does not enable urea to be removed in sufficient amounts. Despite very many experiments, it has not been possible, hitherto, to use any absorbent which is selective for urea, in haemodialysis, because of the narrow conditions of pH and concentration which are specific to the dialysis liquid. It has been proposed to use a selective enzyme, urease, which converts urea to ammonium carbonate and to attach the ammonium ion, for example, to ion exchange resins or to zirconyl phosphate. However, this method has the disadvantage of forming ammonium ions and ammonia which are toxic. Furthermore, one must not under any circumstances increase the proportion of ammonia in the blood to beyond 0.6 mg. per litre: this restriction is difficult to satisfy and requires that binding agents for the ammonium ion be used in large excess.

The present invention provides a method for chemical regeneration of a dialysis liquid, which requires the use of only a small volume of dialysis liquid and which is very effective, and, at the same time, simple and reliable.

The present invention provides a process for the regeneration of a dialysis liquid which has passed through a haemodialyser, wherein sodium hypochlorite is introduced into the dialysis liquid, prior to the dialysis liquid being returned to the haemodialyser.

The dialysis liquid may flow in a closed circuit from the haemodialyser outlet, through a regenerating zone back to the haemodialyser inlet with the hypochlorite being introduced near to the outlet. The sodium hypochlorite is conveniently introduced into the dialysis liquid as an aqueous solution and this solution generally also contains sodium chloride.

It has been found that sodium hypochlorite degrades urea at a satisfactory rate, under conditions which are compatible with haemodialysis, especially having regard to the pH, concentration and temperature which must be maintained in dialysis liquid.

Thus, by way of example, if the dialysis liquid is at a temperature of 37° C. and at a pH of 7.4 and if it contains 0.2 g./l. urea, then, for an initial molar ratio of sodium hypochlorite to urea of 3 (stoichiometric proportion), the period of time for half the urea to be degraded (reaction half-life) is found to be approximately 7 minutes.

It is found, moreover, that sodium hypochlorite degrades, by oxidation, not only urea but also other waste matter carried along by the dialysis liquid, especially nitrogen-containing waste matter such as creatinine and uric acid. The rates of degradation of these other waste materials are different, to that of urea, but are also satisfactory.

Thus, still by way of example, under identical conditions to those suggested above, it is found that, for a molar ratio (arbitrary) of sodium hypochlorite to creatinine of 12, the period of time necessary for half of the creatinine in a solution containing 0.004 g./l. to be oxidised is 2 minutes.

For a ratio of sodium hypochlorite to uric acid, of 3, the uric acid initially being present at a concentration of 0.04 g./l., oxidation of half of the uric acid is achieved in less than 1 minute.

The use of sodium hypochlorite, which is known to be a powerful oxidising agent, in even indirect association with blood, which is a complex and delicate liquid, may seem surprising and it might be expected that the presence of sodium hypochlorite in a dialysis liquid, which is separated from the blood in a haemodialyser only by a simple semi-permeable membrane, could lead to serious disadvantages.

However, we have found that the rates of oxidation, by sodium hypochlorite, of the nitrogen-containing waste matter carried along in the dialysis liquid are much greater than those of the other reducing substances present in the plasma, and hence in the dialysis liquid. This applies for example, to glucose. The other reducing substances are therefore not substantially affected by the presence of sodium hypochlorite.

Moreover, possible haemolysis which could be caused by excess hypochlorite which dialysed through the membrane of the haemodialyser towards the blood, can be prevented in several ways.

A first method consists of introducing into the dialysis liquid, amounts of sodium hypochlorite which are just sufficient to degrade the oxidisable waste matter, that is to say, the hypochlorite concentration in the dialysis liquid at the inlet to the haemodialyser, after it has reacted with the oxidisable waste matter, is practically zero.

Another method involves reducing any excess hypochlorite remaining in the dialysis liquid after degrading the oxidisable waste material by introducing an isotonic solution of a biocompatible reducing agent, such as ascorbic acid, into the dialysis liquid, before it re-enters the haemodialyser. Ascorbic acid is normally present in blood and a possible slight excess would not lead to any disadvantage.

Of course, these two methods can be used in conjunction with one another.

The use of sodium hypochlorite has great advantages over other methods of regenerating the dialysis liquid, especially with respect to other products which are capable of degrading urea, because it yields reaction products which are soluble or volatile, and which, in every case, are compatible with blood. The use of hypochlorite does not yield any toxic product, and in particular does not produce ammonium ions. The product of the reduction of sodium hypochlorite is sodium chloride, which is normally present in plasma and consequently in the dialysis liquid.

It is preferred to introduce the sodium hypochlorite solution at a concentration such that the osmotic pressure of the dialysis liquid is not substantially changed. Thus, the composition of the sodium hypochlorite solution introduced is advantageously such that, after reduction of the hypochlorite, the concentration of chloride ions and of sodium ions in the dialysis liquid remains unchanged. This concentration, which is generally between 0.54 and 0.55% in the case of chloride ions and 0.35% to 0.36% in the case of sodium ions, can be obtained from a solution containing 5.74 g./l. of sodium hypochlorite and 4.51 g./l. of sodium chloride.

Water, nitrogen and carbon dioxide, which do not have any harmful effect on the patient, are obtained as by-products from the oxidation of urea by sodium hypochlorite.

The nitrogen produced is evolved as a gas, because, at the temperature of the human body, its partial pressure in the plasma is already in equilibrium with atmospheric pressure.

The carbon dioxide produced can be evolved as a gas in the apparatus or can be removed by the lungs.

Sodium hypochlorite has still further advantages in the process of the present invention. Thus, after the treatment, it can be used to sterilise the dialysis liquid circuit, and even the blood circuit after dialysis through the membranes. Its antibacterial and antiviral properties are well established. Furthermore, if the dialysis liquid is passed, as it usually is, through activated charcoal to remove some of the impurities present in the dialysis liquid, the activated charcoal can be regenerated by the hypochlorite during and/or after the dialysis.

The process of the invention has another particularly important advantage; it does not prevent the amount of liquid ultrafiltered during a haemodialysis session from being measured. The volume of ultrafiltrate is equal to the difference between the volume of the liquid removed by an overflow from the dialysis liquid circuit and the volume of sodium hypochlorite solution introduced into this same circuit, these being volumes which are easy to measure during the haemodialysis.

It is thus seen that the use of sodium hypochlorite considerably simplifies and improves the conventional haemodialysis treatments.

Of course, it is also possible to combine its action with that of other purifying agents, such as, for example, active charcoal or ion exchange resins.

The invention also includes apparatus for carrying out the haemodialysis process of the present invention comprising a haemodialyser, the blood side of which is adapted for attachment to the blood supply of a patient to be haemodialysed, and the dialysis liquid side of which is connected to a closed liquid circuit for regeneration of dialysis liquid and return of the regenerated liquid to the haemodialyser wherein the closed circuit includes:

(a) Pumping means for circulating the dialysis liquid,
(b) Means for introducing sodium hypochlorite into the dialysis liquid circuit,
(c) Means for the removal of gas and liquid from the dialysis liquid,
(d) Means for measuring the concentration of sodium hypochlorite in the dialysis liquid immediately prior to its return to the haemodialyser and
(e) Means for generating an adjustable pressure drop through the closed circuit. It is convenient that the means for introducing sodium hypochlorite is controlled by the said means for measuring the residual concentration of sodium hypochlorite. The apparatus preferably includes means for injecting a solution of a biocompatible reducing agent into the dialysis liquid immediately prior to its return to the haemodialyser, and as part of the closed circuit, at least one cartridge containing active charcoal.

A particular method of carrying out the processing of the invention will now be described, by way of example with reference to the apparatus illustrated schematically and without a definite scale in the accompanying drawing.

A haemodialyser 1 is equipped with a dialysis membrane 2 which separates compartment 3, for the flow of the blood to be purified, from compartment 4 for the dialysis liquid.

The dialysis liquid is pumped through a loop circuit 5, by a circulating pump 6, generally located near the outlet A of the haemodialyser. Preferably, pump 6 provides a substantially constant flow rate. Adjustable means suitable for generating a pressure drop for example a throttling tap 15, makes it possible to maintain reduced pressures, of the desired values, in compartment 4, inside the haemodialyser.

Heat exchangers 12 make it possible to heat the dialysis liquid to, and to keep it at, the desired temperature, generally between 37° and 38° C.

Closed circuit 5 includes a cell 7 containing active charcoal to absorb a part of the nitrogen-containing waste matter.

The circuit also includes, in accordance with the invention, means for introducing, intermittently or preferably continuously, into the dialysis liquid, a solution of sodium hypochlorite, for example, from reservoir 8 and tap 9. A tubular oxidation reactor 11 is also included in the circuit, the capacity of which corresponds to a dwell time which is sufficient for the sodium hypochlorite to degrade the urea in the dialysis liquid. A capacity of between 1 and 10 litres is generally very suitable.

Reactor 11 is followed in the circuit by means 18 for the removal of gas and excess liquid. This can consist, for example, of a tube 13 which is connected to the upper wall of the reactor and feeds a container 14. Reservoir 8 and container 14 can advantageously be graduated to make it possible to measure, by difference, the amounts of ultrafiltrate obtained.

Finally, means 10, e.g. a checking cell for measuring the proportion of sodium hypochlorite which remains in the dialysis liquid, is included in the circuit just prior to the inlet where dialysis liquid returns to the haemodialyser. This cell can be of the potentiometric type and can contain an indicating electrode of platinum and a reference electrode of silver/silver chloride/sodium chloride, isotonic with the dialysis liquid. Means 10 can advantageously control and adjust the aperture of tap 9 in order to maintain, in the dialysis liquid, a proportion of residual hypochlorite equal to the required value, for example, substantially zero.

Means for injecting a solution of a biocompatible reducing agent, such as ascorbic acid, can also be included in the circuit. This may be a reservoir 16 and a pump 17. The speed of the pump 17 is advantageously adjusted to introduce a slight excess of ascorbic acid.

A haemadialysis operation is carried out in the following manner. All the circuits are first sterilised, for example using sodium hypochlorite, and the active charcoal is regenerated after the previous treatment by sodium hypochlorite or by any other means. Circuit 5 is then filled with dialysis liquid of the usual composition, pump 6 is started up and the reduction in pressure in the haemodialyser is adjusted by means of tap 15. At the same time, the blood circuit is primed by physiological serum, connected to the arterial circuit (not shown), purged and connected to the venous circuit (not shown) of the patient by the usual method.

The addition of the hypochlorite solution to the dialysis liquid is then started. Cell 10 acts on tap 9 to maintain a substantially zero residual proportion of sodium hypochlorite in the dialysis liquid, after reaction with the impurities. In order to neutralise any residue of sodium hypochlorite, a slight excess of an isotonic solution of ascorbic acid is injected from reservoir 16 through pump 17 which is actuated by cell 10.

The dialysis liquid is thus permanently regenerated during the entire duration of the treatment. About 20 litres of a solution containing 5.74 g./l. of sodium hypochlorite and 4.51 g./l. of sodium chloride are sufficient to destroy approximately 30 g. of urea. This result can be achieved in 4 hours.

We claim:
1. Process for the regeneration of a dialysis liquid which has passed through a haemodialyser, wherein sodium hypochlorite is introduced into the dialysis liquid, in a quantity sufficient to oxidise a substantial proportion of the urea in the liquid prior to the dialysis liquid being returned to the haemodialyser.
2. Process according to claim 1, wherein a sodium hypochlorite solution which is isotonic with plasma is introduced into the dialysis liquid.
3. Process according to claim 1, wherein the amount of sodium hypochlorite introduced into the dialysis liquid is such that only traces of sodium hypochlorite remain in the dialysis liquid, after destruction of the oxidisable waste matter in the dialysis liquid, when the dialysis liquid is returned to the haemodialyser.
4. Process according to claim 1 wherein an isotonic solution of a biocompatible reducing agent is introduced into the dialysis liquid before it is returned to the haemodialyser.
5. Process according to claim 4, wherein the biocompatible reducing agent is ascorbic acid.
6. Process according to claim 1 wherein the dialysis liquid passes over active charcoal before being returned to the haemodialyser.
7. Process according to claim 6 wherein the active charcoal is regenerated after a haemodialysis session in preparation for the next haemodialysis session.
8. Process according to claim 7, wherein the active charcoal is regenerated by treatment with sodium hypochlorite.
9. Process according to claim 1 wherein the dialysis liquid flows in a closed circuit from the haemodialyser outlet to the haemodialyser inlet.
10. Process according to claim 1 wherein there is introduced into the dialysis liquid an aqueous solution consisting essentially of water and about 5.74 g./l. sodium hypochlorite and 4.51 g./l. sodium chloride.

11. Apparatus for carrying out the process according to claim 1 comprising a haemodialyser, the blood side of which is adapted for attachment to the blood supply of a patient to be haemodialysed, and the dialysis liquid side of which is connected to a closed liquid circuit for regeneration of dialysis liquid and return of the regenerated liquid to the haemodialyser wherein the closed circuit includes:
   (a) pumping means for circulating the dialysis liquid,
   (b) means for introducing sodium hypochlorite into the dialysis liquid circuit,
   (c) means for the removal of gas and liquid from the dialysis liquid,
   (d) means for measuring the concentration of sodium hypochlorite in the dialysis liquid immediately prior to its return to the haemodialyser and
   (e) means for generating an adjustable pressure drop through the closed circuit.

12. Apparatus according to claim 11, wherein the said means for introducing sodium hypochlorite is controlled by the said means for measuring the residual concentration of sodium hypochlorite.
13. Apparatus according to claim 11 including means for injecting a solution of a biocompatible reducing agent into the dialysis liquid immediately prior to its return to the haemodialyser.
14. Apparatus according to claim 10 including as part of the closed circuit, at least one cartridge containing active charcoal.

References Cited
UNITED STATES PATENTS

| | | | |
|---|---|---|---|
| 3,506,126 | 4/1970 | Serfass et al. | 210—195 X |
| 3,733,266 | 5/1973 | Bishop et al. | 210—62 X |
| 3,697,418 | 1/1971 | Johnson | 210—195 X |

FRANK A. SPEAR, Jr., Primary Examiner

U.S. Cl. X.R.

210—321